(12) United States Patent
Watanabe et al.

(10) Patent No.: US 9,403,989 B2
(45) Date of Patent: Aug. 2, 2016

(54) PRODUCTION PROCESS FOR SELF-DISPERSIBLE PIGMENT, SELF-DISPERSIBLE PIGMENT, INK, INK CARTRIDGE AND INK JET RECORDING METHOD

(71) Applicant: CANON KABUSHIKI KAISHA, Tokyo (JP)

(72) Inventors: Taiki Watanabe, Akishima (JP); Koichi Suzuki, Yokohama (JP); Ryuji Higashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/748,354

(22) Filed: Jun. 24, 2015

(65) Prior Publication Data

US 2015/0376416 A1    Dec. 31, 2015

(30) Foreign Application Priority Data

Jun. 30, 2014  (JP) .................. 2014-133785

(51) Int. Cl.
    *C09D 11/322*    (2014.01)
    *C09C 3/08*    (2006.01)
    (Continued)

(52) U.S. Cl.
    CPC ............... *C09C 3/08* (2013.01); *B41J 2/17503* (2013.01); *C09D 11/322* (2013.01); *C09D 11/324* (2013.01)

(58) Field of Classification Search
    CPC ............. B41J 2/01; B41J 2/0057; B41J 2/05; B41J 2/1433; B41J 2/17; B41J 2/1755; B41J 2/17503; B41J 2/17593; B41J 2/21; B41J 2/211; B41J 2/2107; B41J 2/2114; B41J 2/2117; B41J 2/2056; B41J 11/0015; B41J 11/002; B41J 3/60; B41M 5/0011; B41M 5/0017; B41M 5/0256; B41M 5/52; B41M 5/5218; B41M 7/00; B41M 7/0072; B41M 7/0081; B41M 7/009; C09D 11/005; C09D 11/30; C09D 11/32; C09D 11/322; C09D 11/328; C09D 11/36; C09D 11/38; C09D 11/40; C09D 11/52; C09D 11/54; C09D 11/101; C09D 3/08

USPC ............. 347/9–22, 56, 86, 88, 95–105; 106/31.13, 31.27, 31.6, 31.85, 31.77, 106/31.75; 523/160, 161
See application file for complete search history.

(56) References Cited

U.S. PATENT DOCUMENTS

| | | |
|---|---|---|
| 5,851,280 A | 12/1998 | Belmont et al. |
| 5,900,029 A | 5/1999 | Belmont et al. |

(Continued)

FOREIGN PATENT DOCUMENTS

| | | |
|---|---|---|
| JP | H08-3498 A | 1/1996 |
| JP | H10-510861 A | 10/1998 |
| JP | 2000-072743 A | 3/2000 |

OTHER PUBLICATIONS

Ando, Takeya, et al., "Iodine-Catalyzed Aziridination of Alkenes using Chloramine-T as a Nitrogen Source," Tetrahedron 54, 1998, pp. 13485-13494.

(Continued)

*Primary Examiner* — Matthew Luu
*Assistant Examiner* — Rut Patel
(74) *Attorney, Agent, or Firm* — Fitzpatrick, Cella, Harper & Scinto (57) ABSTRACT

The invention provides a production process for a self-dispersible pigment, including a step of bonding a functional group containing a hydrophilic group to a particle surface of a pigment by causing a compound represented by the following general formula (1) ($R_1$ is a halogen atom, $R_2$ is an alkali metal, $R_3$ is a single bond, —CO—, —CONH— or —SO$_2$—, and $R_4$ is a group having at least one of an aliphatic group and an aromatic group and being substituted with a hydrophilic group such as a carboxylic acid group) to react with the particle surface of the pigment:

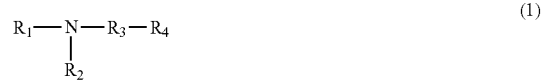

19 Claims, 2 Drawing Sheets

(51) Int. Cl.
 C09D 11/324 (2014.01)
 B41J 2/175 (2006.01)

(56) References Cited

U.S. PATENT DOCUMENTS

| | | | |
|---|---|---|---|
| 6,042,643 | A | 3/2000 | Belmont et al. |
| 6,494,946 | B1 | 12/2002 | Belmont et al. |
| 6,521,034 | B1 | 2/2003 | Osumi et al. |
| 6,547,381 | B2 | 4/2003 | Watanabe et al. |
| 6,706,105 | B2 | 3/2004 | Takada et al. |
| 6,740,151 | B2 | 5/2004 | Belmont et al. |
| 7,005,461 | B2 | 2/2006 | Sanada et al. |
| 7,160,376 | B2 | 1/2007 | Watanabe et al. |
| 7,294,185 | B2 | 11/2007 | Belmont et al. |
| 7,371,274 | B2 | 5/2008 | Sanada et al. |
| 7,423,075 | B2 | 9/2008 | Ikegami et al. |
| 7,449,513 | B2 | 11/2008 | Sato et al. |
| 7,498,364 | B2 | 3/2009 | Sato et al. |
| 7,528,179 | B2 | 5/2009 | Suda et al. |
| 7,528,182 | B2 | 5/2009 | Teshima et al. |
| 7,563,853 | B2 | 7/2009 | Tsubaki et al. |
| 7,598,332 | B2 | 10/2009 | Ikegami et al. |
| 7,601,790 | B2 | 10/2009 | Sato et al. |
| 7,605,192 | B2 | 10/2009 | Sanada et al. |
| 7,754,000 | B2 | 7/2010 | Nakahama et al. |
| 7,914,616 | B2 | 3/2011 | Nakahama et al. |
| 8,007,097 | B2 | 8/2011 | Sanada et al. |
| 8,450,393 | B2 | 5/2013 | Tsubaki et al. |
| 2003/0095914 | A1 | 5/2003 | Belmont et al. |
| 2005/0034629 | A1 | 2/2005 | Belmont et al. |
| 2005/0239918 | A1 | 10/2005 | Nakazawa et al. |
| 2006/0100310 | A1 | 5/2006 | Nakazawa et al. |
| 2006/0246149 | A1* | 11/2006 | Buchholz .......... A61K 8/0241 424/603 |
| 2007/0089641 | A1* | 4/2007 | Shakhnovich ......... C09B 57/00 106/31.77 |
| 2015/0029241 | A1 | 1/2015 | Sanada et al. |

OTHER PUBLICATIONS

Shillington, James, et al. "A New Method for the Resolution of Racemic Carbonyl Compounds: Synthesis and Use of 4-(4-Carboxyphenyl)-semicarbazide," Journal of the American Chemical Society, vol. 80, Dec. 20, 1958, pp. 6551-6553.
Minakata, Satoshi, and Mitsou Komatsu, "Development of New Synthetic Methods for Heterocycles Using Chloramine-T as a Nitrogen Source," Journal of the Society of Organic Synthetic Chemistry, vol. 61, No. 7, 2003, pp. 706-714.
Minakata, Satoshi, et al., "The ionic introduction of an N1 unit to C60 and a unique rearrangement of aziridinofullerene," Chemical Communications, No. 3, Jan. 21, 2008, pp. 323-325.
U.S. Appl. No. 14/747,343, filed Jun. 23, 2015, Taiki Watanabe, Koichi Suzuki, Ryuji Higashi, Masashi Hirose.
U.S. Appl. No. 14/749,933, filed Jun. 25, 2015, Mikio Sanada, Taiki Watanabe, Ryuji Higashi, Koichi Suzuki.
U.S. Appl. No. 14/748,697, filed Jun. 24, 2015, Ryuji Higashi, Taiki Watanabe, Koichi Suzuki.
U.S. Appl. No. 14/748,717, filed Jun. 24, 2015, Ryuji Higashi, Taiki Watanabe Koichi, Suzuki Hiroshi Tanabe.
U.S. Appl. No. 14/749,820, filed Jun. 25, 2015, Takakazu Mizutani, Koichi Suzuki, Ryuji Higashi, Taiki Watanabe.

* cited by examiner

PRODUCTION PROCESS FOR SELF-DISPERSIBLE PIGMENT, SELF-DISPERSIBLE PIGMENT, INK, INK CARTRIDGE AND INK JET RECORDING METHOD

BACKGROUND OF THE INVENTION

1. Field of the Invention

The present invention relates to a production process for a self-dispersible pigment, a self-dispersible pigment, an ink, an ink cartridge and an ink jet recording method.

2. Description of the Related Art

A self-dispersible pigment is mainly produced by a chemical pigment-modifying technology. For example, Japanese Patent Application Laid-Open No. H10-510861 describes a process for obtaining a self-dispersible pigment by causing a pigment to react with a diazonium salt. In addition, Japanese Patent Application Laid-Open No. H08-003498 describes a process for obtaining a self-dispersible pigment by causing a pigment to react with hypohalous acid.

However, the conventional pigment-modifying technologies have not satisfied a production process with high safety and reaction efficiency taking environmental burdens which have been regarded as important in recent years into consideration. In, for example, the production process described in Japanese Patent Application Laid-Open No. H10-510861, a nitrite low in stability is utilized. In addition, residue of the nitrite or a nitrogen oxide may occur in some cases in the process of treating a pigment with a diazonium salt. Further, reaction efficiency is hard to be improved due to bubbles generated in the reaction. Even in the production process described in Japanese Patent Application Laid-Open No. H08-003498 on the other hand, the reaction efficiency is low, and the resultant pigment is also hard to be purified because impurities are produced in plenty.

SUMMARY OF THE INVENTION

Accordingly, it is an object of the present invention to provide a production process with high reaction efficiency for a self-dispersible pigment useful as a coloring material for an ink or the like. In addition, another object of the present invention is to provide a self-dispersible pigment produced by the above-described production process for the self-dispersible pigment, an ink using this self-dispersible pigment, and an ink cartridge and an ink jet recording method using this ink.

The above objects can be achieved by the present invention described below. According to the present invention, there is thus provided a production process for a self-dispersible pigment, comprising a step of bonding a functional group containing a hydrophilic group to a particle surface of a pigment by causing a compound represented by the following general formula (1) to react with the particle surface of the pigment:

(1)

wherein $R_1$ is a halogen atom, $R_2$ is an alkali metal, $R_3$ is a single bond, —CO—, —CONH— or —SO$_2$—, and $R_4$ is a group having at least one of an aliphatic group and an aromatic group and being substituted with at least one hydrophilic group selected from the group consisting of a carboxylic acid group, a sulfonic acid group, a phosphoric acid group and a phosphoric acid group.

According to the present invention, there can be provided a production process with high reaction efficiency for a self-dispersible pigment useful as a coloring material for an ink or the like. In addition, according to another embodiment of the present invention, there can be provided a self-dispersible pigment produced by this production process for the self-dispersible pigment, an ink using this self-dispersible pigment, and an ink cartridge and an ink jet recording method using this ink.

Further features of the present invention will become apparent from the following description of exemplary embodiments with reference to the attached drawings.

BRIEF DESCRIPTION OF THE DRAWINGS

FIGS. 2A and 2B schematically illustrate an example of an ink jet recording apparatus used in an ink jet recording method according to the present invention, in which

DESCRIPTION OF THE EMBODIMENTS

Preferred embodiments of the present invention will now be described in detail in accordance with the accompanying drawings. However, the present invention is not limited to the following embodiments. Incidentally, when an ionic group forms a salt, the ionic group may be present in a state of being dissociated into an ion in an ink. However, such a group is represented as "ionic group" for convenience's sake in the present invention. In addition, a self-dispersible pigment may be described as "pigment" merely. Various physical property values in the present specification are values at ordinary temperature (25° C.) unless expressly noted.

Production Process for Self-Dispersible Pigment:

The production process for a self-dispersible pigment according to the present invention has a step of bonding a functional group containing a hydrophilic group to a particle surface of a pigment by causing a compound represented by the following general formula (1) to react with the particle surface of the pigment. This step may also be expressed as "Step 1".

(1)

wherein $R_1$ is a halogen atom, $R_2$ is an alkali metal, $R_3$ is a single bond, —CO—, —CONH— or —SO$_2$—, and $R_4$ is a group having at least one of an aliphatic group and an aromatic group and being substituted with at least one hydrophilic group selected from the group consisting of a carboxylic acid group, a sulfonic acid group, a phosphoric acid group and a phosphoric acid group.

According to the production process for a self-dispersible pigment according to the present invention (hereinafter also referred to as "production process" merely), the self-dispersible pigment can be produced by one-pot synthesis with high reaction efficiency even at ordinary temperature (25° C.) without using a specific reaction apparatus or a specific liquid medium. Since the reaction efficiency is high in particular, a self-dispersible pigment with a high introduced amount of a functional group can be obtained while reducing the use amount of the compound represented by the general formula (1), which is a treatment agent for the pigment. In addition, since the generation of a byproduct is inhibited, purification after the production is also easy. Moreover, the use of the stable treatment agent can reduce burdens on the environment, unlike the conventional production process for a self-dispersible pigment.

The reaction efficiency in the present invention can be calculated according to, for example, the following procedure. Upon the production of the self-dispersible pigment, "molar number of hydrophilic group in treatment agent" is calculated from the molar number of the treatment agent used per 1.0 g of the pigment. This "molar number of hydrophilic group in treatment agent" is the molar number of the hydrophilic group of the treatment agent used per 1.0 g of the pigment. For example, when a compound having two carboxylic acid groups in its molecule is used as the treatment agent, the calculation is made with the molar number regarded as being twice of the molar number determined by utilizing the molecular weight of this treatment agent. In addition, with respect to the self-dispersible pigment produced, the amount of the hydrophilic group contained in a functional group on a particle surface of the pigment ("molar number of hydrophilic group in pigment", value per 1.0 g of the pigment) is determined. When a treatment agent having a hydrophilic group in the form of an anhydride is used, such a hydrophilic group in the self-dispersible pigment produced becomes an anionic group, so that "molar number of hydrophilic group" in the treatment agent and the pigment is calculated as a molar number of the anionic group. The reaction efficiency can be calculated from "molar number of hydrophilic group in pigment" and "molar number of hydrophilic group in treatment agent" obtained above according to the following expression (A).

Reaction efficiency (%)=("Molar number of hydrophilic group in pigment"/"Molar number of hydrophilic group in treatment agent")×100    (A)

Higher reaction efficiency means that a pigment can be modified into a self-dispersible pigment with a less used amount of the treatment agent. Therefore, the high reaction efficiency enables not only having an advantage from the viewpoint of cost, but also reducing the generation of impurities caused by the reaction. Moreover, purification efficiency of an aqueous dispersion liquid containing the self-dispersible pigment can also be improved. In addition, when an ink containing the self-dispersible pigment produced as a coloring material is applied to, for example, an ink jet recording method, lowering of ejection characteristics caused by impurities can be inhibited, and moreover purification efficiency of an aqueous dispersion liquid containing the self-dispersible pigment can be improved. Therefore, the reaction efficiency is favorably made as high as possible. Specifically, the reaction efficiency is favorably 10% or more, more favorably 20% or more, particularly favorably 30% of more. Incidentally, the theoretical upper limit of the reaction efficiency is 100%.

An estimated mechanism of a reaction used in the production process according to the present invention is shown below. The description will hereinafter be made taking a case where a compound represented by the general formula (1) is used as the treatment agent and carbon black is used as the pigment, as an example.

First, $R_2$ is removed as an ion from a compound A (compound represented by the general formula (1)) to form a compound B as an anionic species. The compound B is substituted with a halogen ($R_1$), which is electron-attractive, onto the nitrogen atom. Therefore, the nitrogen atom is in a state of being high in reactivity. The compound B is nucleophilically added to a double bond between aromatic carbon atoms on a particle surface of carbon black, whereby $R_3$-$R_4$ is bonded to the particle surface of carbon black to obtain a self-dispersible pigment D. The removal of $R_1$ and $R_2$ can be caused to efficiently progress by utilizing energy such as heat.

The treatment agent for the pigment used in the production process according to the present invention is an organic haloamine-alkali metal compound having a hydrophilic group in its molecular structure, such as an organic chloramine-alkali metal compound. This treatment agent is considered to have a function of bonding a functional group containing a hydrophilic group to the particle surface of the pigment by reacting with a carbon-carbon double bond (C=C) present on a particle surface of a pigment. In the above-described reaction mechanism, the reaction rate is easily controlled, so that the reaction relatively moderately progress. According to the production process of the present invention, a self-dispersible pigment with a high introduced amount of a functional group can be thus obtained even when the use amount of the treatment agent for the pigment is small compared with the conventional production processes for the self-dispersible pigment. In addition, the functional group of the resultant self-dispersible pigment has a structure in which a group having at least one of an aliphatic group and an aromatic group is substituted with a hydrophilic group. Therefore, the resultant self-dispersible pigment has high dispersion stability.

An organic haloamine-alkali metal compound is known as a raw material for synthesizing an aziridine compound. In recent years, such an example that it is used as a raw material for synthesizing a heterocyclic compound has been reported. For example, a synthesis process for an aziridine compound using an alkaline metal salt of Chloramine T as a nitrogen source is disclosed in Journal of The Society of Organic Synthetic Chemistry, Japan 61 (7), 706-714 (2003). In addition, the fact that fullerene $C_{60}$ is caused to react with an anionic species of a chloramine compound in toluene to form an aziridine ring together with 'C—C' constituting the fullerene is described in Chemical Communications, 323-325 (2008).

The progress of the reaction utilized in the production process according to the present invention was confirmed by the following two synthetic examples using an organic haloamine-metal compound and a compound having a carbon-carbon double bond. In the following synthesis examples, styrene was used as the compound having the carbon-carbon double bond, and investigation was made with an aqueous system.

Synthetic Example 1

In this synthesis, 4-(aminosulfonyl)benzoic acid (amine compound) is first caused to react with sodium hypochlorite (halogenating agent) to synthesize 4-(chloroamino)-sulfonylbenzoic acid (treatment agent). 4-(Chloroamino)-sulfonylbenzoic acid thus synthesized is then caused to react with styrene to obtain a compound having an aziridine ring. Hereinafter, it will be specifically described.

Into a 50-ml flask, 1.0 g of 4-(aminosulfonyl)benzoic acid (product of TOKYO CHEMICAL INDUSTRY CO., LTD.), 2.5 ml of a 6 mmol/l aqueous solution of sodium hydroxide and 10 ml of ion-exchanged water were put, and the temperature thereof was kept at a temperature of 5° C. or less by an ice bath. A halogenating agent (sodium hypochlorite, an aqueous solution having a chlorine content of 4%) was added dropwise to this mixture. At this time, the reaction was pursued by HPLC (column: ODS-P, developing solvent: acetonitrile/0.1 M phosphate buffer solution (1/1)) to complete the dropping of the halogenating agent when disappearance of the amine compound was confirmed, thereby obtaining a liquid reaction mixture. The amount of the halogenating agent (in terms of chlorine) used up to the completion of the dropping was 1.25 times as much as a molar amount of the amine compound.

The following operation was then conducted conforming to Method A described in Tetrahedron, 54, 13485-13494. Into a vessel (manufactured by IMEX Co., Ltd.) having a capacity of 50 ml and being capable of controlling temperature, 0.52 g of styrene, 10 ml of acetonitrile and 0.2 g of a reaction accelerator (iodine) were put, and the temperature of the contents was kept at 5° C. The whole amount of the liquid reaction mixture obtained above was put therein, the resultant mixture was agitated for 1 hour at a temperature of 5° C., the temperature is further raised to 25° C., and agitation was conducted for 48 hours at 1,000 rpm to obtain a liquid reaction mixture.

After the resultant liquid reaction mixture, 50 ml of chloroform and 20 ml of ion-exchanged water were mixed, the organic layer was collected. The thus-collected organic layer was rinsed with a 0.1 mol/l aqueous hydrochloric acid solution 3 times and then rinsed once with ion-exchanged water to remove the solvent. It was further purified by a silica gel column chromatogram (developing solvent: chloroform/ethyl acetate (7/3)), thereby obtaining a compound having an aziridine ring. As a result of analysis, it was found that this compound has a structure represented by the following formula (A):

Results of elemental analysis ($C_{15}H_{13}NO_4S$) and mass analysis of the compound obtained above are shown below.
Elemental Analysis (% by Mass)
  Theoretical value C, 59.4; H, 4.3; N, 4.6; O, 21.1; S, 10.6.
  Found value C, 59.1; H, 4.2; N, 4.1; O, 21.9; S, 10.7.
Mass Analysis (MS (m/z)
  Calculated value: 303.
  Found value: 303.

Synthetic Example 2

In this synthetic example, prearranged sodium 4-(chloroamino)sulfonylbenzoate (treatment agent) was caused to react with styrene to obtain a compound having an aziridine ring. Hereinafter, it will be specifically described.

Into a vessel (manufactured by IMEX Co., Ltd.) having a capacity of 50 ml and being capable of controlling a temperature, 0.52 g of styrene, 10 ml of acetonitrile and 0.2 g of a reaction accelerator (iodine) were put, and the temperature of the contents was kept at 5° C. Into this vessel, 1.4 g of a treatment agent (sodium 4-(chloroamino)sulfonylbenzoate, product of American Custom Chemicals) was added, the resultant mixture was agitated for 1 hour at a temperature of 5° C., the temperature is further raised to 25° C., and agitation was conducted for 48 hours at 1,000 rpm to obtain a liquid reaction mixture. Hereinafter, the operation was conducted in the same manner as in Synthetic Example 1 to obtain a compound having an aziridine ring. As a result of analysis, it was found that this compound has a structure represented by the formula (A).

Results of elemental analysis ($C_{15}H_{13}NO_4S$) and mass analysis of the compound obtained above are shown below.
Elemental Analysis (% by Mass)
  Theoretical value C, 59.4; H, 4.3; N, 4.6; O, 21.1; S, 10.6.
  Found value C, 59.6; H, 4.1; N, 4.4; O, 20.9; S, 11.0.
Mass Analysis (MS (m/z)
  Calculated value: 303.
  Found value: 303.

It was confirmed from Synthetic Examples 1 and 2 that the reaction utilized in the production process according to the present invention progresses. The fact that a reaction of a pigment with an organic haloamine-alkali metal compound is caused to progress by the same reaction mechanism is also shown in Examples which will be described subsequently. On the other hand, an example where an organic haloamine-alkali metal compound substituted with a hydrophilic group is used in a method for modifying the surface of a pigment particle has not been reported to date. Quite naturally, a technique of introducing a functional group containing a hydrophilic group into a particle surface of a pigment with high reaction efficiency by such a simple procedure that the pigment is mixed with the organic haloamine-alkali metal compound has not been known.

In Japanese Patent Application Laid-Open No. H10-510861, a self-dispersible pigment is produced by using a diazonium salt as the treatment agent. However, the diazonium salt used as the treatment agent is easily decomposed by influence of an alkali or a temperature exceeding ordinary temperature (25° C.). When the diazonium salt is decomposed in the reaction system, various decomposed products are produced. Therefore, various side reactions such as a reaction of the decomposed product with a liquid medium or oxygen, a reaction between the decomposed products, and other side reactions than these reactions are easy to occur. Accordingly, when it is attempted to obtain the self-dispersible pigment with the high introduced amount of the functional group by using the diazonium salt, it is necessary to use the diazonium salt in an amount more than that of the pigment. However, when the amount of the diazonium salt used is increased, many nitrogen gas bubbles are generated, so that it is hard to improve the reaction efficiency.

Since the compound represented by the general formula (1) is chemically stable and hardly influenced by pH or temperature, the pH or temperature of the reaction system may be arbitrarily set. In order to improve the reaction efficiency, the pH of the reaction system is favorably set to be from neutral to alkaline. Specifically, the pH of the reaction system is favorably 1 or more and 13 or less, more favorably 1 or more and 10 or less. Above all, the pH of the reaction system is more favorably 6 or more and 10 or less, particularly favorably 8 or more and 10 or less. In a low pH range such as being acidic, the treatment agent may be decomposed to easily liberate a halogen in some cases. Liberated halogen gas may be consumed as a halogenating agent for an amine compound which will be described subsequently. However, when the halogen is excessively liberated, halogen gas is generated, so that a reaction apparatus and an exhaust device which can be used for the halogen gas may be required in some cases. On the other hand, the halogen is hard to be liberated in the range of from being neutral to alkaline. In the present invention, a buffer is favorably used for inhibiting pH change upon the reaction. The buffer may be a buffer having buffering ability in any range of being acidic, neutral and alkaline. However, a buffer having buffering ability in the range of being neutral to alkaline is favorably used for the reason described above.

In order to control the reaction rate of the radical addition reaction, the temperature may also be set to another temperature than ordinary temperature (25° C.) The temperature may be suitably set according to the kind of the treatment agent. Specifically, the temperature is favorably 80° C. or less, more favorably 5° C. or more and 80° C. or less, furthermore favorably 10° C. or more and 70° C. or less. When the temperature is made high, the reaction rate can be raised. However, side reactions are easy to occur, so that the reaction efficiency may be lowered in some cases. When the temperature is made low on the other hand, the side reactions are hard to occur. However, the reaction rate is lowered, so that the reaction time may become long in some cases.

The self-dispersible pigment produced can be used in various uses after it is suitably subjected to post treatments such as purification. Specifically, the self-dispersible pigment may be provided as a powdery or pellet-shaped self-dispersible pigment in which no liquid medium is present. In this case, the liquid medium may be removed by pressure reduction or heating making good use of an evaporator. The liquid medium may also be removed by drying making use of a freeze drying process or an oven.

In addition, the self-dispersible pigment may be provided as a dispersion liquid in which the self-dispersible pigment is contained in a liquid medium in a state of being dispersed in the liquid medium. In this case, a dispersion liquid containing the resultant self-dispersible pigment may also be utilized in various uses as it is when only water is used as the liquid medium without using an organic solvent. The self-dispersible pigment may also be provided as a final dispersion liquid after the self-dispersible pigment is subjected to rinsing or adjustment of the content of the self-dispersible pigment. In the case where a liquid medium containing an organic solvent is used, the organic solvent may be removed. Examples of a method of removing the organic solvent include a method in which water is added after the organic solvent is removed by pressure reduction or heating making good use of an evaporator. In addition, there is a method in which a process of adding water after the organic solvent is removed by ultrafiltration is repeated. In particular, when a dispersion liquid in a state where the self-dispersible pigment is dispersed in an aqueous liquid medium is provided, the dispersed state can be retained more stably by ionically dissociating the hydrophilic group contained in the functional group of the self-dispersible pigment. Since the hydrophilic group contained in the functional group is anionic, the dispersion liquid is favorably made alkaline.

The self-dispersible pigment produced is suitable for use as a coloring material in various compositions and articles such as ink, paint, plastic, rubber, paper and carbon fiber.

Pigment Species and Physical Property Values:

As for the pigment constituting the self-dispersible pigment (pigment species), for example, an inorganic pigment such as carbon black, calcium carbonate and titanium oxide, or an organic pigment such as azo, phthalocyanine and quinacridone may be used. Among these, carbon black or the organic pigment is favorably used, and carbon black is particularly favorably used as the pigment because it has more reaction active points on its particle surface than other pigments, and so the introduced amount of the functional group is easy to be increased. As carbon black, any carbon black such as furnace black, lamp black, acetylene black and channel black may be used.

The DBP oil absorption of carbon black is favorably 50 ml/100 g or more and 200 ml/100 g or less, more favorably 120 ml/100 g or more and 170 ml/100 g or less, particularly favorably 120 ml/100 g or more and 150 ml/100 g or less. The DBP oil absorption can be measured by a method conforming to JIS K 6221 or ASTM D 2414. These methods are those in which dibutyl phthalate is added dropwise to 100 g of carbon black under agitation, and then the amount of dibutyl phthalate added is measured at the point of time of the maximum torque.

The specific surface area of carbon black according to the BET method is favorably 100 $m^2/g$ or more and 600 $m^2/g$ or less. The specific surface area according to the BET method can be measured by a method conforming to JIS K 6217 or ASTM D 6556. These methods are those in which deaerated carbon black is immersed in liquid nitrogen, and then the amount of nitrogen adsorbed on a particle surface of carbon black is measured when having reached the equilibrium.

The primary particle size of carbon black is favorably 10 nm or more and 40 nm or less. Carbon black is generally present in such a state that plural primary particles sterically extend like a bunch of grapes. The primary particle size means a particle size of carbon black (primary particle) of the smallest unit forming one pigment particle. The primary particle size of carbon black can be determined by observing and measuring the particle size of carbon black of the smallest unit forming the pigment particle at about 100 points through a transmission or scanning type electron microscope and calculating the arithmetical mean thereof.

The average particle size of carbon black is favorably 50 nm or more and 200 nm or less. The average particle size means a particle size of carbon black as an ordinarily existing form. In the present invention, the average particle size can be measured as a 50% cumulative value [$D_{50}$ (nm)] in a volume-based particle size distribution by using a dynamic light scattering type particle size distribution measuring device or the like.

The primary particle size of the organic pigment is favorably 50 nm or more and 150 nm or less. In addition, the average particle size of the organic pigment is favorably 50 nm or more and 250 nm or less. The definitions of the primary particle size and average particle size of the organic pigment are the same as the definitions of the primary particle size and average particle size of carbon black, respectively.

Treatment Agent:

In the production process according to the present invention, the compound represented by the general formula (1) is used as the treatment agent for the pigment. The compound represented by the general formula (1) is an organic haloamine-alkali metal compound having a hydrophilic group, such as an organic chloramine-alkali metal compound.

(1)

wherein $R_1$ is a halogen atom, $R_2$ is an alkali metal, $R_3$ is a single bond, —CO—, —CONH— or —SO$_2$—, and $R_4$ is a group having at least one of an aliphatic group and an aromatic group and being substituted with at least one hydrophilic group selected from the group consisting of a carboxylic acid group, a sulfonic acid group, a phosphoric acid group and a phosphoric acid group.

$R_1$ is a halogen atom. As examples of the halogen atom, there may be mentioned a fluorine atom, a chlorine atom, a bromine atom and an iodine atom. Among these, the chlorine atom is favorable.

$R_2$ is an alkali metal. As examples of the alkali metal, there may be mentioned lithium, sodium and potassium. Among these, sodium is favorable. In the general formula (1), it is particularly favorable that $R_1$ is a chlorine atom and $R_2$ is sodium.

$R_3$ is a single bond, —CO—, —CONH— or —SO$_2$—. The case where $R_3$ is a single bond means that the nitrogen atom directly bonds to $R_4$. $R_4$ is a group having at least one of an aliphatic group and an aromatic group and being substituted with at least one hydrophilic group selected from the group consisting of a carboxylic acid group, a sulfonic acid group, a phosphoric acid group and a phosphoric acid group.

As examples of the aliphatic group, there may be mentioned an alkyl group, an alkenyl group and an alkynyl group. The alkyl, alkenyl and alkynyl groups may be any of linear, branched and cyclic chains. The number of carbon atoms in the linear and branched alkyl, alkenyl and alkynyl groups is favorably of about 1 to 12. In addition, the cyclic alkyl, alkenyl and alkynyl groups may be any of a single ring and a complex (fused) ring. The number of elements constituting a ring is favorably about 3 to 8. As examples of the aliphatic group, there may be mentioned linear saturated alkyl groups such as methyl, ethyl, propyl, butyl, pentyl and hexyl groups; branched saturated alkyl groups such as isopropyl, isobutyl and 2-ethylhexyl groups; alkenyl groups such as ethenyl, propenyl and butenyl groups; alkynyl groups such as ethynyl, propynyl and butynyl groups; and alicyclic groups such as cyclopropyl, cyclobutyl, cyclopentyl and cyclohexyl groups. The aliphatic group may have such a substituent as a halogen atom such as a fluorine atom, a chlorine atom and a bromine atom, and a hydroxy group.

As examples of the aromatic group, there may be mentioned an aryl group and a heteroaryl group. The aryl and heteroaryl groups may be any of a single ring and a complex (fused) ring. The number of elements constituting a ring is favorably about 3 to 8. As examples of the aryl group, there may be mentioned a phenyl group, a naphthyl group, an anthracenyl group, a phenanthrenyl group and a biphenyl group. As examples of the heteroaryl group, there may be mentioned a pyridyl group, an imidazolyl group, a pyrazolyl group, a pyridinyl group, a thienyl group and a thiazolyl group. Among these, phenyl, naphthyl, anthracenyl, phenanthrenyl, biphenyl and pyridinyl groups are favorable, and phenyl and naphthyl groups are more favorable.

As examples of the group having at least one of an aliphatic group and an aromatic group, there may be mentioned groups in which the above-mentioned groups are directly or through a general linker structure such as —O—, —N<, —CO—, —COO—, —CONH—, —N=N—, —SO— and —SO$_2$—. In order to improve the hydrophilicity of the functional group, it is more favorable to let the group having at least one of the aliphatic group and the aromatic group have the linker structure.

The group having at least one of the aliphatic group and the aromatic group will become a linking group (a part thereof) between the particle surface of the pigment and the hydrophilic group. Therefore, the group having at least one of the aliphatic group and the aromatic group may be any group so long as it can modify the pigment into a self-dispersible pigment in relation with the hydrophilic group. That is, if the amount of the hydrophilic group substituted is small although the structure of the linking group is large, the hydrophilicity of the functional group bonded to the particle surface of the pigment does not become high, so that it is difficult to modify the pigment into the self-dispersible pigment. Accordingly, when the structure of the linking group is made large, it is favorable that the amount of the hydrophilic group substituted is made large, or the introduced amount of the functional group at the particle surface of the pigment is increased.

The hydrophilic group with which the group having at least one of the aliphatic group and the aromatic group is substituted is at least one selected from the group consisting of a carboxylic acid group, a sulfonic acid group, a phosphoric acid group and a phosphonic acid group. These hydrophilic groups may also be in the form of a salt or an anhydride so long as it is chemically possible.

The carboxylic acid, sulfonic acid, phosphoric acid and phosphonic acid groups as the hydrophilic groups will be described. When the carboxylic acid, sulfonic acid, phosphoric acid or phosphonic acid group forms a salt, at least one proton of such a group is substituted by a cation. As examples of the cation, there may be mentioned an alkali metal ion, an ammonium ion and an organic ammonium ion. As examples of the alkali metal ion, there may be mentioned lithium, sodium and potassium ions. As examples of the organic ammonium ion, there may be mentioned cations of aliphatic amines such as mono- to tri-alkylamines and aliphatic alcoholamines such as mono- to tri-alkanolamines, and salts thereof. A salt may be present in a state of being dissociated into an ion in an aqueous liquid. However, such a salt is represented as "salt" for convenience's sake.

The substitution number of hydrophilic groups is theoretically equal to the number of hydrogen atoms present in the group having at least one of the aliphatic group and the aromatic group. For example, the substitution number of hydrophilic groups is 1 to 3 for a methyl group, 1 to 5 for an ethyl group, 1 to 5 for a phenyl group, 1 to 7 for a naphthyl group, 1 to 9 for an anthracenyl group and 1 to 4 for a pyridyl group. When one or two hydrophilic groups are actually substituted per one group having at least one of the aliphatic group and the aromatic group though the number may vary according to the structure, the pigment can be modified into the self-dispersible pigment.

The compound represented by the general formula (1) can be obtained by causing its corresponding amine compound to react with a halogenating agent. When reactivity upon synthesis is considered, a primary amine compound having a structure represented by $H_2N—R_3—R_4$ is favorably used. $R_3$ and $R_4$ have the same meanings as $R_3$ and $R_4$ in the general formula (1).

When the compound represented by the general formula (1) is formed by the reaction of a primary amine compound with a halogenating agent, the pH of the reaction system is favorably set to be neutral to alkaline. The primary amine compound can be thereby kept in a state of a basic form ($—HN_2$), and so a reaction with the halogenating agent and a reaction for the production of the self-dispersible pigment can be caused to efficiently progress. A general alkaline agent may be used for pH adjustment at this time. In particular, an alkali metal hydroxide such as lithium hydroxide, sodium hydroxide or potassium hydroxide is particularly favorably used. The reason for this is that the alkali metal hydroxide can be used not only for the pH adjustment but also as an alkali metal source of $R_2$ of the compound represented by the general formula (1).

As examples of the halogenating agent, there may be mentioned halogens and halogen oxoacids. As examples of the halogens, there may be mentioned fluorine, chlorine, bromine and iodine, wherein chlorine, bromine and iodine are favorable. Examples of the halogen oxoacids, there may be mentioned inorganic halogen oxoacids such as hypohalous acids, halous acids, halogen acids and perhalogen acids; and organic halogen oxoacids such as alkyl hypohalites, alkyl halites, alkyl haloates and alkyl perhaloates. The halogen oxoacid may form a salt. As examples of the salt formed by the halogen oxoacid, there may be mentioned salts of alkali metals such as lithium, sodium and potassium, and ammonium salts. Chlorine or bromine is favorable as the halogen in the halogen oxoacid. When reactivity is considered, an alkyl group having about 1 to 6 carbon atoms is favorable as the alkyl group in the organic halogen oxoacid. As examples of the alkyl group having about 1 to 6 carbon atoms, there may be mentioned methyl, ethyl, n-propyl, isopropyl, n-butyl, t-butyl, n-pentyl and n-hexyl groups.

In the present invention, a halogen oxoacid salt such as sodium hypochlorite, potassium hypochlorite, sodium hypobromite, potassium hypobromite, calcium hypochlorite, t-butyl hypochlorite or t-butyl hypobromite is favorably used as the halogenating agent. In addition, a combination of a halogen oxoacid and an alkali metal hydroxide may also be used as such a halogen oxoacid salt. As examples thereof, there may be mentioned a combination of hypochlorous acid and sodium hydroxide, a combination of hypobromous acid and sodium hydroxide, a combination of t-butyl hypochlorite and sodium hydroxide, a combination of t-butyl hypobromite and sodium hydroxide. These halogenating agents have an advantage in that they can be inexpensively obtained. Conventionally known halogenating agents such as phosphorus oxychloride, thienyl chloride, N-halosuccinamide, dibromoisocyanuric acid, pyridinium dichlorobromate, pyridinium tribromide and sulfuryl chloride may lower the purification efficiency of the self-dispersible pigment produced in some cases. Therefore, the halogens and halogen oxoacids mentioned above are favorably used as the halogenating agent.

When the compound represented by the general formula (1) is synthesized in advance prior to the reaction upon the production of the self-dispersible pigment, the reaction temperature upon the synthesis is favorably suitably controlled for avoiding solidification of a liquid medium and moreover inhibiting decomposition upon the synthesis of the compound represented by the general formula (1). Specifically, the reaction temperature is favorably set to the range of from a temperature exceeding the solidifying point of a liquid medium used to 25° C. or less, and the temperature is more favorably 0° C. to 5° C. When the self-dispersible pigment is produced by one-pot synthesis subsequently to the synthesis of the compound represented by the general formula (1) by the reaction of the amine compound with the halogenating agent on the other hand, there is no need to set the reaction temperature to the range from the temperature exceeding the solidifying point of the liquid medium used to 25° C. In this case, it is only necessary to set the reaction temperature to a suitable temperature for producing the pigment.

Reaction Accelerator:

In the present invention, the above-described Step (1) is favorably conducted in the presence of a reaction accelerator to produce the self-dispersible pigment. The term "reaction accelerator" in the present invention means a compound having a catalytic action or a compound having a halogen-removing action. The reaction accelerator may be used for improving reaction rate. However, the reaction utilized in the production process according to the present invention is caused to progress without using the reaction accelerator. As the reaction accelerator, there may be mentioned at least one selected from the group consisting of copper, copper oxides, copper halides, copper sulfate, iodine, ammonia, aliphatic amines, aliphatic alcoholamines and hydrazine.

Copper and copper compounds, and iodine have a catalytic action and thus function as the reaction accelerator. As examples of copper and copper compounds, there may be mentioned copper, copper oxides (CuO and $Cu_2O$), copper halides ($CuX$ and $CuX_2$; X is a halogen atom such as fluorine, chlorine, bromine or iodine) and copper sulfate. Since a heavy metal is liable to be contaminated into a dispersion liquid containing the self-dispersible pigment produced, iodine is favorably used rather than copper and copper compounds. A synthetic method for the aziridine compound in the presence of iodine is disclosed in, for example, Japanese Patent Application Laid-Open No. 2000-072743.

Ammonia, aliphatic amines, aliphatic alcoholamines and hydrazine have a halogen-removing action and thus function as the reaction accelerator. These compound may be used in the form of a salt. Among these, ammonia, aliphatic amines and aliphatic alcohol-amines are favorable. Aliphatic primary amines such as methylamine and ethylamine are more favorably used because they are excellent in solubility in a liquid medium, easily available and cheap.

Liquid Medium:

The production process according to the present invention is generally conducted in an aqueous liquid medium. As for the aqueous liquid medium, water alone or an aqueous medium which contains water as a main solvent and uses a protonic or aprotic organic solvent in combination may be used. The aqueous medium is a mixed solvent of water and an organic solvent. A solvent which is miscible with or dissolved in water even in any proportion is favorably used as the organic solvent. In particular, a uniformly mixed solvent containing 50% by mass or more of water is favorably used as the aqueous medium. Furthermore, only water, which does not substantially contain any organic solvent, is favorably used as the aqueous medium. Ion-exchanged water or pure water is favorably used as the water.

As examples of a buffer used in the buffer solution of the aqueous system, there may be mentioned weak acids and salts thereof. For example, an aqueous solution of a weak acid or an aqueous solution of a weak acid and a weak acid salt may be used as the buffer solution. In addition, a pH standard solution such as a phthalate pH standard solution (pH 4), a neutral phosphate pH solution (pH 7) or a borate pH standard solution (pH 9) may also be used.

The protonic organic solvent is an organic solvent having a hydrogen atom bonded to oxygen or nitrogen (an acidic hydrogen atom). The aprotic organic solvent is an organic solvent having no acidic hydrogen atom. As examples of the organic solvent, there may be mentioned alcohols, alkylene glycols, polyalkylene glycols, glycol ethers, glycol ether esters, carboxylic acid amides, ketones, keto-alcohols, cyclic ethers, nitrogen-containing compounds and sulfur-containing compounds.

As examples of the liquid medium suitably usable in the production process according to the present invention, there may be mentioned water, water/methanol mixed solvents, water/ethanol mixed solvents, water/ethylene glycol mixed solvents, water/N-methylpyrrolidone mixed solvents, water/tetrahydrofuran mixed solvent and water/acetone mixed solvents.

Ink:
Self-Dispersible Pigment

The ink according to the present invention contains a self-dispersible pigment as a coloring material. This self-dispersible pigment is the self-dispersible pigment produced by the above-described production process according to the present invention. The self-dispersible pigment is used as the coloring material, so that addition of a dispersant for dispersing a pigment in an ink is unnecessary. Alternatively, the amount of the dispersant added can be reduced. The content (% by mass) of the self-dispersible pigment in the ink is favorably 0.1% by mass or more and 15.0% by mass or less, more favorably 1.0% by mass or more and 10.0% by mass or less based on the total mass of the ink. The ink according to the present invention may contain a dye together with the pigment for the purpose of color adjustment.

In the self-dispersible pigment used as the coloring material in the ink according to the present invention, a hydrophilic group is contained in the functional group thereof. When the ink according to the present invention is an aqueous ink, the introduced amount of the functional group into the pigment is favorably 0.10 mmol/g or more. If the introduced amount of the functional group into the pigment is less than 0.10 mmol/g, the dispersion stability may be somewhat lowered. In addition, the introduced amount of the functional group into the pigment is favorably 1.00 mmol/g or less, more favorably 0.80 mmol/g or less.

The introduced amount of the functional group is an index indicating the amount of the functional group bonded directly or through another atomic group to the particle surface of the pigment and represented by an amount (mmol) of the functional group per 1 g of the self-dispersible pigment. In the present invention, the introduced amount of the functional group is determined in the following manner. First, the structure of the functional group is identified by simultaneous differential thermal balance mass analysis (TG-MS) or solid state NMR. The introduced amount of the hydrophilic group is then determined by a colloid titration method. Methyl glycol chitosan or hydrochloric acid may be used in the analysis of the hydrophilic group by the colloid titration method. Thereafter, the introduced amount of the hydrophilic group is divided by the number of hydrophilic groups when plural hydrophilic groups are contained in one functional group to convert it to the introduced amount (mmol) of the functional group per 1 g of the self-dispersible pigment.

Aqueous Medium:

In the ink according to the present invention, water or an aqueous medium which is a mixed solvent of water and a water-soluble organic solvent may be used. In the present invention, an aqueous ink containing at least water as an aqueous medium is favorably provided. Deionized water (ion-exchanged water) is favorably used as the water. The content (% by mass) of water in the ink is favorably 10.0% by mass or more and 90.0% by mass or less, more favorably 50.0% by mass or more and 90.0% by mass or less based on the total mass of the ink.

No particular limitation is imposed on the water-soluble organic solvent so long as it is soluble in water, and then an alcohol, a polyhydric alcohol, a polyglycol, a nitrogen-containing polar solvent or a sulfur-containing polar solvent may be used. Among these, a water-soluble organic solvent having a lower vapor pressure at 25° C. than water is favorably used. The content (% by mass) of the water-soluble organic solvent in the ink is favorably 5.0% by mass or more and 90.0% by mass or less, more favorably 10.0% by mass or more and 50.0% by mass or less based on the total mass of the ink.

Other Additives:

The ink according to the present invention may also contain a water-soluble organic compound which is solid at ordinary temperature, such as a polyhydric alcohol such as trimethylolpropane and trimethylolethane, urea, a urea derivative such as ethyleneurea and hydantoin, or a sugar, as needed, in addition to the above-described components. In addition, the ink according to the present invention may also contain various additives such as a surfactant, a pH adjustor, a rust preventive, a preservative, a mildewproofing agent, an antioxidant, an antireductant, an evaporation accelerating agent, a chelating agent and a water-soluble resin, as needed.

Examples of the surfactant include anionic, cationic and nonionic surfactants. The content (% by mass) of the surfactant in the ink is favorably 0.1% by mass or more and 5.0% by mass or less, more favorably 0.1% by mass or more and 2.0% by mass or less based on the total mass of the ink.

A nonionic surfactant such as a polyoxyethylene alkyl ether, a polyoxyethylene fatty acid ester, a polyoxyethylene alkyl phenyl ether, a polyoxyethylene-polyoxypropylene block copolymer or an acetylene glycol-based compound is favorably used as the surfactant. The hydrophobic group of the surfactant is easy to adsorb on the particle surface of the self-dispersible pigment. Thus, the dispersed state of the self-dispersible pigment in the ink can be more stably retained. The reason for this is as follows. Among the surfactants, the nonionic surfactant has no ionic group, so that its interaction with the functional group of the self-dispersible pigment is hard to occur, but it is easy to adsorb on the particle surface of the self-dispersible pigment.

Physical Properties of Ink:

In the case where the ink according to the present invention is applied to an ink jet system, it is favorable to suitably control the physical property values thereof. Specifically, the surface tension of the ink at 25° C. is favorably 10 mN/m or more and 60 mN/m or less, more favorably 20 mN/m or more and 60 mN/m or less. In particular, the surface tension is favorably 30 mN/m or more and 50 mN/m or less, more favorably 30 mN/m or more and 40 mN/m or less. The viscosity of the ink at 25° C. is favorably 1.0 mP·s or more and 10.0 mP·s or less, more favorably 1.0 mP·s or more and 5.0 mP·s or less, particularly favorably 1.0 mP·s or more and 3.0 mP·s or less. The pH of the ink at 25° C. is favorably 5 or more and 9 or less.

Figure 1:
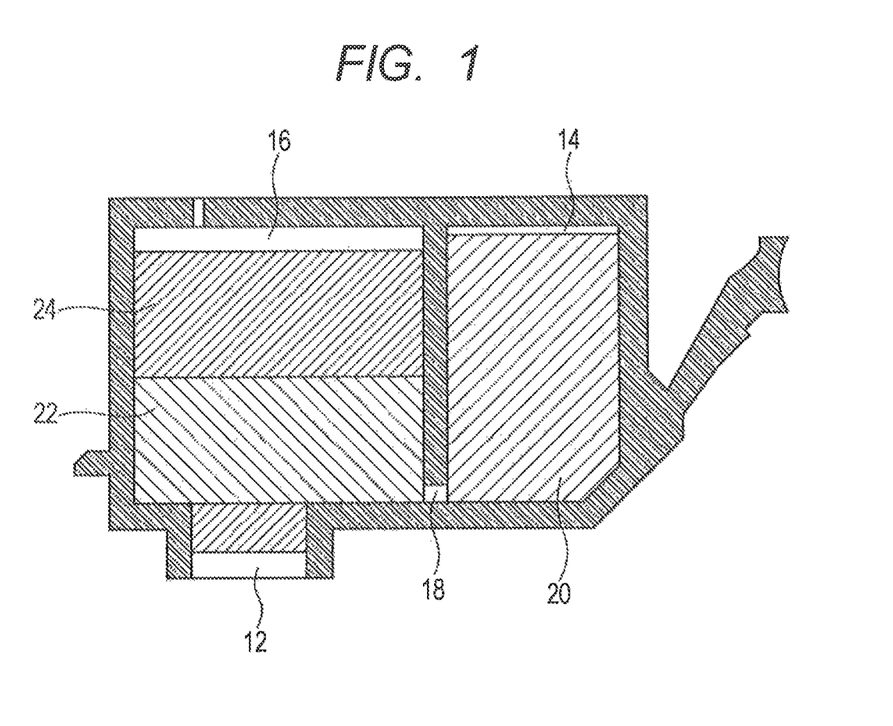
FIG. 1 is a sectional view schematically illustrating an ink cartridge according to an embodiment of the present invention.

Ink Cartridge:

The ink cartridge according to the present invention is provided with an ink and an ink storage portion storing this ink. The ink stored in this ink storage portion is the above-described ink according to the present invention. FIG. 1 is a sectional view schematically illustrating an ink cartridge according to an embodiment of the present invention. As illustrated in FIG. 1, an ink supply port 12 for supplying the ink to a recording head is provided in a bottom surface of the ink cartridge. The interior of the ink cartridge is the ink storage portion for storing the ink. The ink storage portion is constituted by an ink storage chamber 14 and an absorber storage chamber 16, and these chambers are communicated with each other through a communication port 18. The absorber storage chamber 16 is communicated with the ink supply port 12. A liquid ink 20 is stored in the ink storage chamber 14, and absorbers 22 and 24 holding the ink in an impregnated state are stored in the absorber storage chamber 16. The ink storage portion may also be so constructed that the whole amount of the ink stored is held by the absorber without providing the ink storage chamber storing the liquid ink. In addition, the ink storage portion may also be so constructed that the whole amount of the ink is stored in a liquid state without having the absorber. Further, the ink cartridge may also be constructed so as to have an ink storage portion and a recording head.

Ink Jet Recording Method:

The ink jet recording method according to the present invention is a method of ejecting the above-described ink according to the present invention from a recording head of an ink jet system to record an image on a recording medium. As systems for ejecting the ink, a system in which mechanical energy is applied to the ink and a system in which thermal energy is applied to the ink are mentioned. In the present invention, the system in which the thermal energy is applied to the ink to eject the ink is particularly favorably adopted. Steps of the ink jet recording method may be those publicly known except that the ink according to the present invention is used.

Figure 2A:
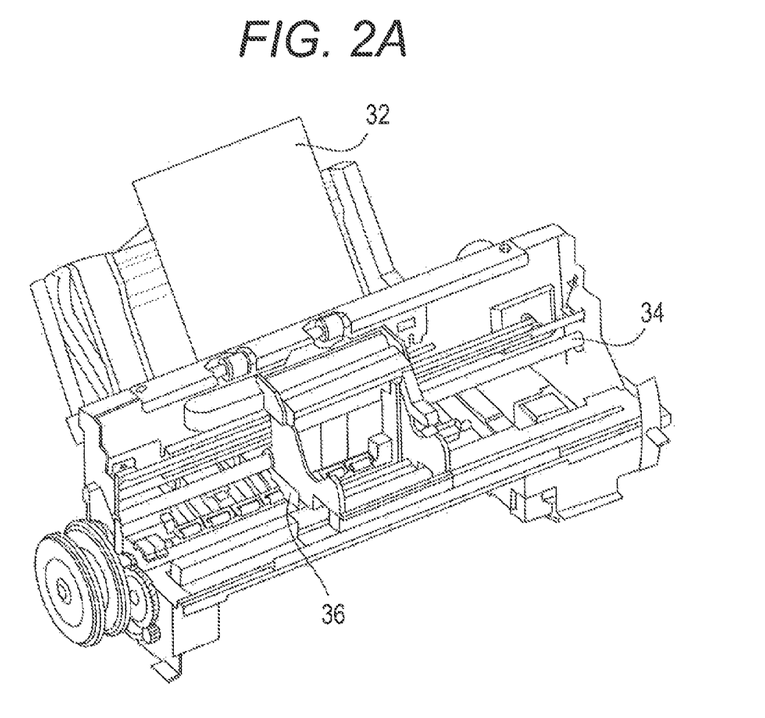
FIG. 2A is a perspective view illustrating a principal part of the ink jet recording apparatus.
Figure 2B:
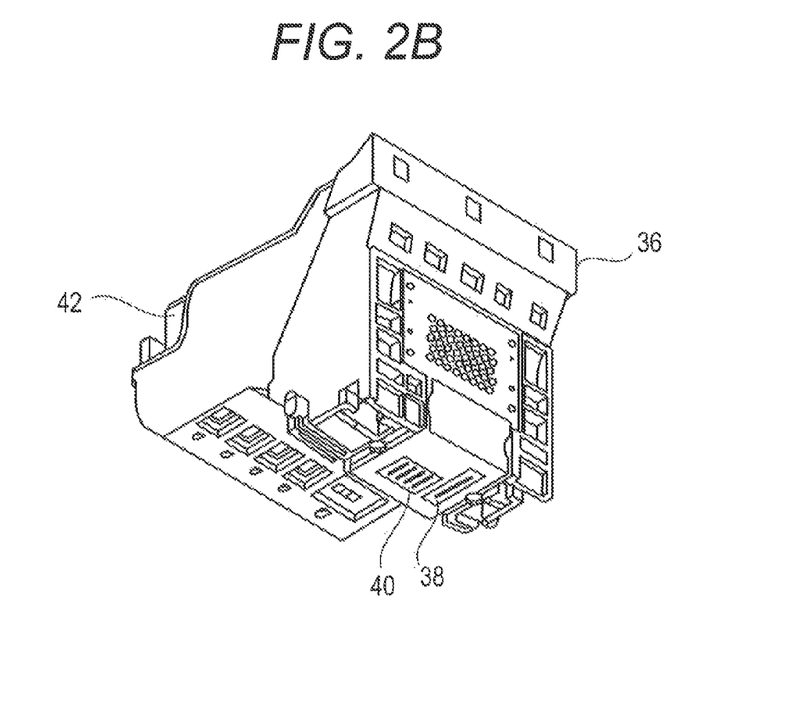
FIG. 2B is a perspective view illustrating a head cartridge.

FIGS. 2A and 2B schematically illustrate an example of an ink jet recording apparatus used in the ink jet recording method according to the present invention, in which FIG. 2A is a perspective view illustrating a principal part of the ink jet recording apparatus, and FIG. 2B is a perspective view illustrating a head cartridge. In the ink jet recording apparatus, a conveyance unit (not illustrated) for conveying a recording medium 32 and a carriage shaft 34 are provided. A head cartridge 36 can be mounted on the carriage shaft 34. The head cartridge 36 is provided with recording heads 38 and 40 and is so constructed that an ink cartridge 42 is set. Inks (not illustrated) are ejected toward the recording medium 32 from the recording heads 38 and 40 while the head cartridge 36 is being carried in a primary scanning direction along the carriage shaft 34. The recording medium 32 is then conveyed in a secondary scanning direction by the conveyance unit (not illustrated), whereby an image is recorded on the recording medium 32.

EXAMPLES

The present invention will hereinafter be described in more detail by the following Examples and Comparative Examples. However, the present invention is not limited by the following examples unless going beyond the gist of the present invention. Incidentally, all designations of "part" or "parts" and "%" as to amounts of components are based on mass unless expressly noted.

Production of Self-Dispersible Pigment:

In the following description as to a production process, "mmol/g" means the number of millimoles (mmol) per 1.0 g of a pigment.

Example 1

Into a 300-ml eggplant flask, 1.0 mmol/g of an amine compound, 10 ml of a 6 mol/l aqueous solution of sodium hydroxide and 90 ml of ion-exchanged water were put, and the temperature of the contents was kept at 5° C. or less by an ice bath. 4-(Aminosulfonyl)benzoic acid (product of TOKYO CHEMICAL INDUSTRY CO., LTD.) was used as the amine compound. A halogenating agent (sodium hypochlorite; an aqueous solution having a chlorine content of 4%) was added dropwise while keeping the temperature at 5° C. or less. At this time, the reaction was monitored by HPLC (column: ODS-P, developing solvent: acetonitrile/0.1 mol/l phosphate buffer solution (1/1)) to complete the dropping of the halogenating agent when disappearance of the amine compound was confirmed, thereby obtaining a liquid reaction mixture. The amount of the halogenating agent (in terms of chlorine) used up to the completion of the dropping was 1.25 mmol/g. 18.0 grams of a pigment, and a mixed liquid of 45 ml of ion-exchanged water and 45 ml of acetonitrile were put in a vessel (manufactured by IMEX Co., Ltd.) having a capacity of 400 ml and being capable of controlling temperature and mixed, and the contents were kept at a temperature of 5° C. Carbon black (trade name "TOKA BLACK #8300", product of Tokai Carbon Co., Ltd.) was used as the pigment. The whole amount of the liquid reaction mixture obtained above was put, and the resultant mixture was agitated for 2 hours at 25° C. and 1,000 rpm. Further, the temperature was controlled to 50° C., and agitation was conducted for 22 hours at 1,000 rpm to obtain a liquid reaction mixture. 1 mol/l hydrochloric acid was put into the resultant liquid reaction mixture to adjust pH to 9, thereby obtaining a dispersion liquid. The dispersion liquid was purified by removing impurities from the dispersion liquid by using an ultrafilter (trade name "RP-2100", manufactured by Aira Co.; filter: pencil-shaped module "SAP-0013", manufactured by Asahi Kasei Chemicals Corporation). The purification was conducted by regarding a cycle in which the dispersion liquid is concentrated to 20 ml by the ultrafilter (180 ml of the filtrate fractionated) and then 180 ml of ion-exchanged water is added to dilute the dispersion liquid until the electrical conductivity of the filtrate reached 20 μS/cm or lower. After the content of the resultant self-dispersible pigment was adjusted by ultrafiltration, the resultant dispersion liquid was centrifuged for 15 minutes at a number of revolutions of 5,000 rpm to remove coarse particles, thereby obtaining an aqueous dispersion liquid of Self-Dispersible Pigment 1, in which the content of Self-Dispersible Pigment 1 was 10.0%.

Example 2

An aqueous dispersion liquid of Self-Dispersible Pigment 2 was obtained in the same manner as in Example 1 except that the amine compound was changed to 4-(aminosulfonyl) phthalic acid (product of Sumika Technoservice Corporation).

Example 3

An aqueous dispersion liquid of Self-Dispersible Pigment 3 was obtained in the same manner as in Example 1 except that the amine compound was changed to 4-sulfamoyl-butanoic acid (product of American Custom Chemicals).

Example 4

4-[(Aminocarbonyl)amino]phthalic acid was synthesized conforming to the method described in J. Am. Chem. Soc., 80(24), 6551-6553 (1958). Elemental analysis (% by mass) data of 4-[(aminocarbonyl)amino]phthalic acid synthesized is shown below. An aqueous dispersion liquid of Self-Dispersible Pigment 4 was obtained in the same manner as in Example 1 except that the amine compound was changed to 4-[(aminocarbonyl)amino]phthalic acid, and the mixed liquid of 45 ml of ion-exchanged water and 45 ml of acetonitrile was changed to 90 ml of ion-exchanged water.
Theoretical value C, 48.21; H, 3.60; N, 12.50; O, 35.69.
Found value C, 48.23; H, 3.65; N, 12.41; O, 35.71.

Example 5

An aqueous dispersion liquid of Self-Dispersible Pigment 5 was obtained in the same manner as in Example 1 except that the amine compound was changed to 4-[(aminocarbonyl)amino]phthalic acid, the halogenating agent was changed to t-butyl hypochlorite (product of TOKYO CHEMICAL INDUSTRY CO., LTD.), and the mixed liquid of 45 ml of ion-exchanged water and 45 ml of acetonitrile was changed to 90 ml of ion-exchanged water.

Example 6

An aqueous dispersion liquid of Self-Dispersible Pigment 6 was obtained in the same manner as in Example 1 except that the amine compound was changed to 4-[(aminocarbonyl)amino]phthalic acid, the mixed liquid of 45 ml of ion-exchanged water and 45 ml of acetonitrile was changed to 90 ml of ion-exchanged water, and 1.0 mmol/g of a reaction accelerator was added upon the mixing of the pigment (ammonia (28% aqueous ammonia) was used as the reaction accelerator).

Example 7

An aqueous dispersion liquid of Self-Dispersible Pigment 7 was obtained in the same manner as in Example 1 except that the amine compound was changed to 4-carbamoyl-benzoic acid (product of TOKYO CHEMICAL INDUSTRY CO., LTD.), and the mixed liquid of 45 ml of ion-exchanged water and 45 ml of acetonitrile was changed to a mixed liquid of 45 ml of a pH 7.4 phosphate buffer solution (product of Kishida Chemical Co., Ltd.) and 45 ml of acetonitrile.

Example 8

An aqueous dispersion liquid of Self-Dispersible Pigment 8 was obtained in the same manner as in Example 1 except that the amine compound was changed to 4-aminobenzoic acid (product of TOKYO CHEMICAL INDUSTRY CO., LTD.), and the mixed liquid of 45 ml of ion-exchanged water and 45 ml of acetonitrile was changed to 90 ml of ion-exchanged water.

Example 9

An aqueous dispersion liquid of Self-Dispersible Pigment 9 was obtained in the same manner as in Example 1 except that the amine compound was changed to 4-amino-phthalic acid (product of Sigma Aldrich), and the mixed liquid of 45 ml of ion-exchanged water and 45 ml of acetonitrile was changed to 90 ml of ion-exchanged water.

Example 10

An aqueous dispersion liquid of Self-Dispersible Pigment 10 was obtained in the same manner as in Example 1 except that the amine compound was changed to 4-amino-phthalic acid, the mixed liquid of 45 ml of ion-exchanged water and 45 ml of acetonitrile was changed to 90 ml of ion-exchanged water, and 1.0 mmol/g of a reaction accelerator (iodine) was added upon the mixing of the pigment.

Example 11

An aqueous dispersion liquid of Self-Dispersible Pigment 11 was obtained in the same manner as in Example 1 except that the amine compound was changed to 4-amino-phthalic acid, the mixed liquid of 45 ml of ion-exchanged water and 45 ml of acetonitrile was changed to 90 ml of ion-exchanged water, and 1.0 mmol/g of a reaction accelerator (methylamine) was added upon the mixing of the pigment.

Example 12

An aqueous dispersion liquid of Self-Dispersible Pigment 12 was obtained in the same manner as in Example 1 except that the amine compound was changed to 4-amino-phthalic acid, the mixed liquid of 45 ml of ion-exchanged water and 45 ml of acetonitrile was changed to 90 ml of ion-exchanged water, and 1.0 mmol/g of ammonia (28% aqueous ammonia) was added as a reaction accelerator upon the mixing of the pigment.

Example 13

An aqueous dispersion liquid of Self-Dispersible Pigment 13 was obtained in the same manner as in Example 1 except that the amine compound was changed to 4-amino-phthalic acid, the halogenating agent was changed to t-butyl hypochlorite, 1.0 mmol/g of ammonia (28% aqueous ammonia) was added as a reaction accelerator upon the mixing of the pigment, and the mixed liquid of 45 ml of ion-exchanged water and 45 ml of acetonitrile was changed to 90 ml of ion-exchanged water.

Example 14

An aqueous dispersion liquid of Self-Dispersible Pigment 14 was obtained in the same manner as in Example 1 except that the amine compound was changed to 4-amino-salicylic acid (product of Sigma Aldrich), the mixed liquid of 45 ml of ion-exchanged water and 45 ml of acetonitrile was changed to 90 ml of ion-exchanged water, and 1.0 mmol/g of ammonia (28% aqueous ammonia) was added as a reaction accelerator upon the mixing of the pigment.

Example 15

An aqueous dispersion liquid of Self-Dispersible Pigment 15 was obtained in the same manner as in Example 1 except that the amine compound was changed to (4-amino-benzoylamino)-methane-1,1-diylbisphosphonic acid (product of Konan Chemical Industry Co., Ltd.), the mixed liquid of 45 ml of ion-exchanged water and 45 ml of acetonitrile was changed to 90 ml of ion-exchanged water, and 1.0 mmol/g of ammonia (28% aqueous ammonia) was added as a reaction accelerator upon the mixing of the pigment.

Example 16

An aqueous dispersion liquid of Self-Dispersible Pigment 16 was obtained in the same manner as in Example 1 except that the amine compound was changed to sulfanilic acid (product of Wako Pure Chemical Industries, Ltd.), the mixed liquid of 45 ml of ion-exchanged water and 45 ml of acetonitrile was changed to 90 ml of ion-exchanged water, and 1.0 mmol/g of ammonia (28% aqueous ammonia) was added as a reaction accelerator upon the mixing of the pigment.

Example 17

An aqueous dispersion liquid of Self-Dispersible Pigment 17 was obtained in the same manner as in Example 1 except that the amine compound was changed to 2-aminomalonic acid (product of FCH Group), and the mixed liquid of 45 ml of ion-exchanged water and 45 ml of acetonitrile was changed to 90 ml of ion-exchanged water.

Example 18

An aqueous dispersion liquid of Self-Dispersible Pigment 18 was obtained in the same manner as in Example 1 except that the amine compound was changed to 4-amino-phthalic acid, the mixed liquid of 45 ml of ion-exchanged water and 45 ml of acetonitrile was changed to 90 ml of ion-exchanged water, the pigment was changed to carbon black (trade name "NIPEX 170IQ", product of Orion Engineered Carbons), and 1.0 mmol/g of ammonia (28% aqueous ammonia) was added as a reaction accelerator upon the mixing of the pigment.

Example 19

An aqueous dispersion liquid of Self-Dispersible Pigment 19 was obtained in the same manner as in Example 1 except that the amine compound was changed to 4-amino-phthalic acid, the mixed liquid of 45 ml of ion-exchanged water and 45 ml of acetonitrile was changed to 90 ml of ion-exchanged water, the pigment was changed to carbon black (trade name "#2600", product of Mitsubishi Chemical Corporation), and 1.0 mmol/g of ammonia (28% aqueous ammonia) was added as a reaction accelerator upon the mixing of the pigment.

Example 20

An aqueous dispersion liquid of Self-Dispersible Pigment 20 was obtained in the same manner as in Example 1 except that the amine compound was changed to 4-amino-phthalic acid, the mixed liquid of 45 ml of ion-exchanged water and 45 ml of acetonitrile was changed to 90 ml of ion-exchanged water, the pigment was changed to carbon black (trade name "MCF88", product of Mitsubishi Chemical Corporation), and 1.0 mmol/g of ammonia (28% aqueous ammonia) was added as a reaction accelerator upon the mixing of the pigment.

Example 21

An aqueous dispersion liquid of Self-Dispersible Pigment 21 was obtained in the same manner as in Example 1 except that the amine compound was changed to 4-amino-phthalic acid, the mixed liquid of 45 ml of ion-exchanged water and 45 ml of acetonitrile was changed to 90 ml of ion-exchanged water, the pigment was changed to carbon black (trade name "Color Black FW200", product of Orion Engineered Carbons), and 1.0 mmol/g of ammonia (28% aqueous ammonia) was added as a reaction accelerator upon the mixing of the pigment.

Example 22

An aqueous dispersion liquid of Self-Dispersible Pigment 22 was obtained in the same manner as in Example 1 except that the amine compound was changed to 4-(amino-sulfonyl) phthalic acid, and the pigment was changed to C.I. Pigment Blue 15:3 (trade name "Heliogen Blue D 7079", product of BASF).

Example 23

An aqueous dispersion liquid of Self-Dispersible Pigment 23 was obtained in the same manner as in Example 1 except that the amine compound was changed to 4-[(amino-carbonyl)amino]phthalic acid, the pigment was changed to C.I. Pigment Blue 15:3 (trade name "Heliogen Blue D 7079", product of BASF), and the mixed liquid of 45 ml of ion-exchanged water and 45 ml of acetonitrile was changed to 90 ml of ion-exchanged water.

Example 24

An aqueous dispersion liquid of Self-Dispersible Pigment 24 was obtained in the same manner as in Example 1 except that the amine compound was changed to 4-(amino-sulfonyl) phthalic acid, and the pigment was changed to C.I. Pigment Red 122 (trade name "Hostaperm Pink E02", product of Clariant).

Example 25

An aqueous dispersion liquid of Self-Dispersible Pigment 25 was obtained in the same manner as in Example 1 except that the amine compound was changed to 4-[(amino-carbonyl)amino]phthalic acid, the pigment was changed to C.I. Pigment Red 122 (trade name "Hostaperm Pink E02", product of Clariant), and the mixed liquid of 45 ml of ion-exchanged water and 45 ml of acetonitrile was changed to 90 ml of ion-exchanged water.

Example 26

An aqueous dispersion liquid of Self-Dispersible Pigment 26 was obtained in the same manner as in Example 1 except that the amine compound was changed to 4-[(amino-carbonyl)amino]phthalic acid, the pigment was changed to C.I. Pigment Yellow 108 (trade name "Paliogen Yellow L 1560", product of BASF), and the mixed liquid of 45 ml of ion-exchanged water and 45 ml of acetonitrile was changed to 90 ml of ion-exchanged water.

Comparative Example 1

An aqueous dispersion liquid of Comparative Self-Dispersible Pigment 1 was obtained according to the following procedure conforming to the description in Japanese Patent Application Laid-Open No. H10-510861. Into a 300-ml flask, 3.0 mmol/g of p-aminobenzoic acid (product of TOKYO CHEMICAL INDUSTRY CO., LTD.) and 25 ml of ion-exchanged water were put, and the temperature of the contents was kept at 5° C. by an ice bath. After 5 ml of concentrated hydrochloric acid was additionally added, a solution with 1.5 g of sodium nitrite (product of TOKYO CHEMICAL INDUSTRY CO., LTD.) dissolved in 5.4 ml of ion-exchanged water was added dropwise, and the resultant mixture was agitated for 2 hours while keeping the temperature to obtain a liquid product. After 18.0 g of a pigment and 200 ml of ion-exchanged water were put in a vessel (manufactured by IMEX Co., Ltd.) having a capacity of 400 ml, the liquid product obtained above was added, and the resultant mixture was agitated for 12 hours at 25° C. and a number of revolutions of 2,000 rpm. Carbon black (trade name "TOKA BLACK #8300", product of Tokai Carbon Co., Ltd.) was used as the pigment. Thereafter, the pH of the liquid was adjusted to 9 by adding 15 ml of a 5 mol/l aqueous solution of sodium hydroxide. Purification was then conducted in the same manner as in Example 1 to obtain an aqueous dispersion liquid of Comparative Self-Dispersible Pigment 1, in which the content of Comparative Self-Dispersible Pigment 1 was 10.0%.

Comparative Example 2

An aqueous dispersion liquid of Comparative Self-Dispersible Pigment 2 was obtained without using an amine compound. Eighteen grams of a pigment, 135 ml of ion-exchanged water, 45 ml of acetonitrile, 10 ml of a 6 mol/l aqueous solution of sodium hydroxide and 1.25 mmol/g (in terms of chlorine) of a halogenating agent were prepared. These were put into a vessel (manufactured by IMEX Co., Ltd.) having a capacity of 400 ml and being capable of controlling temperature and mixed, and the resultant mixture was agitated for 2 hours at 25° C. and 1,000 rpm. Carbon black (trade name "TOKA BLACK #8300", product of Tokai Carbon Co., Ltd.) was used as the pigment. Sodium hypochlorite (an aqueous solution having a chlorine content of 4%, product of Wako Pure Chemical Industries, Ltd.) was used as the halogenating agent. The temperature was controlled to 50° C., and agitation was conducted for 22 hours at 1,000 rpm to obtain a liquid reaction mixture. Purification was then conducted in the same manner as in Example 1 to obtain an aqueous dispersion liquid of Comparative Self-Dispersible Pigment 2, in which the content of Comparative Self-Dispersible Pigment 2 was 10.0%. Conditions for production of self-dispersible pigment:

Conditions for production of a self-dispersible pigment are shown in Table 1. Meanings (kinds of pigments) of abbreviations in Table 1 are as follows. In Table 1, "Ph" means phenylene.

CB1: TOKA BLACK #8300 (product of Tokai Carbon Co., Ltd.)
CB2: NIPEX 170IQ (product of Orion Engineered Carbons)
CB3: #2600 (product of Mitsubishi Chemical Corporation)
CB4: MCF88 (product of Mitsubishi Chemical Corporation)
CB5: Color Black FW200 (product of Orion Engineered Carbons)
PC: Heliogen Blue D 7079 (product of BASF)
QA: Hostaperm Pink E02 (product of Clariant)
AZ: Inkjet Yellow 4G (product of Clariant).

TABLE 1

| | | Conditions for production process of self-dispersible pigment | | | | | |
|---|---|---|---|---|---|---|---|
| | | Halogenating | Treatment agent (free acid type) | | | | Kind of |
| | Amine compound | agent | $R_1$ | $R_2$ | —$R_3$— | —$R_4$ | pigment |
| Ex. 1 | 4-(Aminosulfonyl)benzoic acid | NaClO | Cl | Na | —$SO_2$— | —Ph—COOH | CB1 |
| Ex. 2 | 4-(Aminosulfonyl)phthalic acid | NaClO | Cl | Na | —$SO_2$— | —Ph—$(COOH)_2$ | CB1 |
| Ex. 3 | 4-Sulfamoylbutanoic acid | NaClO | Cl | Na | —$SO_2$— | —$C_3H_6$—COOH | CB1 |
| Ex. 4 | 4-[(Aminocarbonyl)amino]phthalic acid | NaClO | Cl | Na | —CONH— | —Ph—$(COOH)2$ | CB1 |
| Ex. 5 | 4-[(Aminocarbonyl)amino]phthalic acid | t-BuOCl | Cl | Na | —CONH— | —Ph—$(COOH)_2$ | CB1 |
| Ex. 6 | 4-[(Aminocarbonyl)amino]phthalic acid | NaClO | Cl | Na | —CONH— | —Ph—$(COOH)_2$ | CB1 |
| Ex. 7 | 4-carbamoyl-benzoic acid | NaClO | Cl | Na | —CO— | —Ph—COOH | CB1 |
| Ex. 8 | 4-Aminobenzoic acid | NaClO | Cl | Na | Single bond | —Ph—COOH | CB1 |
| Ex. 9 | 4-Aminophthalic acid | NaClO | Cl | Na | Single bond | —Ph—$(COOH)_2$ | CB1 |
| Ex. 10 | 4-Aminophthalic acid | NaClO | Cl | Na | Single bond | —Ph—$(COOH)_2$ | CB1 |
| Ex. 11 | 4-Aminophthalic acid | NaClO | Cl | Na | Single bond | —Ph—$(COOH)_2$ | CB1 |
| Ex. 12 | 4-Aminophthalic acid | NaClO | Cl | Na | Single bond | —Ph—$(COOH)_2$ | CB1 |
| Ex. 13 | 4-Aminophthalic acid | t-BuOCl | Cl | Na | Single bond | —Ph—$(COOH)_2$ | CB1 |
| Ex. 14 | 4-Aminosalicylic acid | NaClO | Cl | Na | Single bond | —Ph—(OH)(COOH) | CB1 |
| Ex. 15 | (4-Aminobenzoylamino)-methane-1,1-diylbisphosphonic acid | NaClO | Cl | Na | Single bond | —Ph—CONH—CH$(PO_3H_2)_2$ | CB1 |
| Ex. 16 | Sulfanilic acid | NaClO | Cl | Na | Single bond | —Ph—$SO_3H$ | CB1 |
| Ex. 17 | 2-Aminomalonic acid | NaClO | Cl | Na | Single bond | —CH$(COOH)_2$ | CB1 |
| Ex. 18 | 4-Aminophthalic acid | NaClO | Cl | Na | Single bond | —Ph—$(COOH)_2$ | CB2 |
| Ex. 19 | 4-Aminophthalic acid | NaClO | Cl | Na | Single bond | —Ph—$(COOH)_2$ | CB3 |
| Ex. 20 | 4-Aminophthalic acid | NaClO | Cl | Na | Single bond | —Ph—$(COOH)_2$ | CB4 |
| Ex. 21 | 4-Aminophthalic acid | NaClO | Cl | Na | Single bond | —Ph—$(COOH)_2$ | CB5 |
| Ex. 22 | 4-(Aminosulfonyl)phthalic acid | NaClO | Cl | Na | —$SO_2$— | —Ph—$(COOH)_2$ | PC |
| Ex. 23 | 4-[(Aminocarbonyl)amino]phthalic acid | NaClO | Cl | Na | —CONH— | —Ph—$(COOH)_2$ | PC |

TABLE 1-continued

Conditions for production process of self-dispersible pigment

| | | | | | | | |
|---|---|---|---|---|---|---|---|
| Ex. 24 | 4-(Aminosulfonyl)phthalic acid | NaClO | Cl | Na | —$SO_2$— | —Ph—$(COOH)_2$ | QA |
| Ex. 25 | 4-[(Aminocarbonyl)amino]phthalic acid | NaClO | Cl | Na | —CONH— | —Ph—$(COOH)_2$ | QA |
| Ex. 26 | 4-[(Aminocarbonyl)amino]phthalic acid | NaClO | Cl | Na | —CONH— | —Ph—$(COOH)_2$ | AZ |
| Comp. Ex.1 | p-Aminobenzoic acid | — | — | — | — | —Ph—COOH | CB1 |
| Comp. Ex.2 | — | NaClO | — | — | — | —COOH | CB1 |
| Ref. Ex. | — | — | — | — | — | — | CB1 |

| | Amine compound | Reaction accelerator | Liquid medium | pH | Temp (° C.) | Agitation time (hr) |
|---|---|---|---|---|---|---|
| Ex. 1 | 4-(Aminosulfonyl)benzoic acid | — | Mixed system | Alkaline | 50 | 24 |
| Ex. 2 | 4-(Aminosulfonyl)phthalic acid | — | Mixed system | Alkaline | 50 | 24 |
| Ex. 3 | 4-Sulfamoylbutanoic acid | — | Mixed system | Alkaline | 50 | 24 |
| Ex. 4 | 4-[(Aminocarbonyl)amino]phthalic acid | — | Aqueous system | Alkaline | 50 | 24 |
| Ex. 5 | 4-[(Aminocarbonyl)amino]phthalic acid | — | Aqueous system | Alkaline | 50 | 24 |
| Ex. 6 | 4-[(Aminocarbonyl)amino]phthalic acid | Ammonia | Aqueous system | Alkaline | 50 | 24 |
| Ex. 7 | 4-carbamoyl-benzoic acid | — | Mixed system (containing buffer) | Alkaline | 50 | 24 |
| Ex. 8 | 4-Aminobenzoic acid | — | Aqueous system | Alkaline | 50 | 24 |
| Ex. 9 | 4-Aminophthalic acid | — | Aqueous system | Alkaline | 50 | 24 |
| Ex. 10 | 4-Aminophthalic acid | Iodine | Aqueous system | Alkaline | 50 | 24 |
| Ex. 11 | 4-Aminophthalic acid | Methylamine | Aqueous system | Alkaline | 50 | 24 |
| Ex. 12 | 4-Aminophthalic acid | Ammonia | Aqueous system | Alkaline | 50 | 24 |
| Ex. 13 | 4-Aminophthalic acid | Ammonia | Aqueous system | Alkaline | 50 | 24 |
| Ex. 14 | 4-Aminosalicylic acid | Ammonia | Aqueous system | Alkaline | 50 | 24 |
| Ex. 15 | (4-Aminobenzoylamino)-methane-1,1-diylbisphosphonic acid | Ammonia | Aqueous system | Alkaline | 50 | 24 |
| Ex. 16 | Sulfanilic acid | Ammonia | Aqueous system | Alkaline | 50 | 24 |
| Ex. 17 | 2-Aminomalonic acid | — | Aqueous system | Alkaline | 50 | 24 |
| Ex. 18 | 4-Aminophthalic acid | Ammonia | Aqueous system | Alkaline | 50 | 24 |
| Ex. 19 | 4-Aminophthalic acid | Ammonia | Aqueous system | Alkaline | 50 | 24 |
| Ex. 20 | 4-Aminophthalic acid | Ammonia | Aqueous system | Alkaline | 50 | 24 |
| Ex. 21 | 4-Aminophthalic acid | Ammonia | Aqueous system | Alkaline | 50 | 24 |
| Ex. 22 | 4-(Aminosulfonyl)phthalic acid | — | Mixed system | Alkaline | 50 | 24 |
| Ex. 23 | 4-[(Aminocarbonyl)amino]phthalic acid | — | Aqueous system | Alkaline | 50 | 24 |
| Ex. 24 | 4-(Aminosulfonyl)phthalic acid | — | Mixed system | Alkaline | 50 | 24 |
| Ex. 25 | 4-[(Aminocarbonyl)amino]phthalic acid | — | Aqueous system | Alkaline | 50 | 24 |
| Ex. 26 | 4-[(Aminocarbonyl)amino]phthalic acid | — | Aqueous system | Alkaline | 50 | 24 |
| Comp. Ex.1 | p-Aminobenzoic acid | — | Aqueous system | Acidic | 25 | 12 |
| Comp. Ex.2 | — | — | Mixed system | Alkaline | 50 | 24 |
| Ref. Ex. | — | — | — | — | — | — |

Evaluation:

The respective production processes of Examples and Comparative Examples were evaluated as follows. Evaluation results are shown in Table 2. The structures of the respective functional groups bonded to the particle surfaces of the self-dispersible pigments are also shown in Table 2. In Table 2, "Ph" means "phenyl".

Elemental Analysis:

The self-dispersible pigments produced and carbon black (trade name "TOKA BLACK #8300", product of Tokai Carbon Co., Ltd.; described as Referential Example) used as a raw material were subjected to elemental analysis by an X-ray photoelectron spectroscopic method. The outline of the elemental analysis is as follows. The surface of a sample placed in ultrahigh vacuum was irradiated with soft X-ray to detect photoelectrons emitted from the surface by an analyzer. Since the length in which the photoelectron can travel through a substance (mean free path) is several nanometers, the detection depth in this analysis is of several nanometers. Elemental information of a sample surface can be obtained from the binding energy of bound electrons in a substance. In addition, information about the valence and the bonding state can be obtained from the energy shift of each peak. Further, an elemental composition (% by mass) can be determined from a peak area ratio. Measurement conditions are as follows. Results of the elemental analysis are shown in Table 2. "ND" in Table 2 means a detection limit or less.

Apparatus: Quantera SXM (manufactured by ULVAC-PHI)
Excitation X-ray: Monochromatic AlK α1, 2 rays (1486.6 eV)
X-ray diameter: 200 μm
Photoelectron escape angle: 45° (inclination of a detector to a sample surface).

Evaluation of Reaction Efficiency:

After 80.0 g of 0.1 mol/l hydrochloric acid was added into 20.0 g of an aqueous dispersion liquid of each self-dispersible pigment to precipitate the self-dispersible pigment, a process of removing a supernatant liquid by centrifugation for 30 minutes at a number of revolutions of 5,000 rpm was repeated twice to obtain a sample. The resultant sample was placed in an oven controlled to a temperature of 60° C. and dried for 18 hours to obtain a dried solid product. The resultant dried solid product was mashed in an agate mortar to weigh out 0.5 g of solids. After 30.0 g of a 0.1 mol/l aqueous solution of sodium hydroxide was added to the solids, and the resultant mixture was agitated for one day, centrifugation was conducted for 60 minutes at a number of revolutions of 80,000 rpm by means of a centrifugal separator (manufactured by BECKMAN COULTER) to collect a supernatant liquid. The resultant liquid was subjected to back titration to determine the amount of the hydrophilic group contained in the functional group bonded to the particle surface of the pigment ("molar number of hydrophilic group in pigment", determined as a value per 1.0 g of the pigment). A potentiometric titration device (trade name "AT-510", manufactured by KYOTO ELECTRONICS MANUFACTURING CO., LTD.) was used in the back titration, in which the dropping amount and time were automatically controlled. In addition, 0.1 mol/l hydrochloric acid (product of Wako Pure Chemical Industries, Ltd.) was used as the titrant.

Upon the production of the self-dispersible pigment, "molar number of hydrophilic group in treatment agent" was calculated from the molar number of the treatment agent used per 1 g of the pigment. This "molar number of hydrophilic group in treatment agent" is the molar number of the hydrophilic group in the treatment agent used per 1 g of the pigment. For example, when a compound having two carboxylic acid groups is used as the treatment agent, the calculation is made with the molar number regarded as being twice of the molar number determined by utilizing the molecular weight of the treatment agent.

Reaction efficiency (%) was calculated on the basis o Reaction efficiency (%) was calculated on the basis of the following expression (A) from the above-obtained "molar number of hydrophilic group in pigment" and "molar number of hydrophilic group in treatment agent". The value of the reaction efficiency was shown as an integer value by rounding off the value to one's place for convenience's sake.

Reaction efficiency (%)=("Molar number of hydrophilic group in pigment"/"Molar number of hydrophilic group in treatment agent")×100　　(A)

The reaction efficiency was evaluated from the calculated reaction efficiency value according to the following evaluation criteria. In the present invention, in the following evaluation criteria, "C" was regarded as an unacceptable level, and "AA", "A" and "B" were regarded as acceptable levels.

AA: The reaction efficiency was 30% or more;
A: The reaction efficiency was 20% or more and less than 30%;
B: The reaction efficiency was 10% or more and less than 20%; and
C: The reaction efficiency was less than 10%.

Evaluation of Purification Efficiency:

Purification efficiency was evaluated from the number of cycles of the ultrafiltration for the purification conducted upon the production of the self-dispersible pigment according to the following evaluation criteria. In the present invention, in the following evaluation criteria, "C" was regarded as an unacceptable level, and "A" and "B" were regarded as acceptable levels.

A: The number of cycles was 1 to 3, the amount of residual products and by-products was very small after the production, and purification was easy;
B: The number of cycles was 4 or 5, the amount of residual products and by-products was small after the production, and purification was somewhat easy; and
C: The number of cycles was 6 or more, the amount of residual products and by-products was large after the production, and purification was difficult.

TABLE 2

Evaluation of prouction process and properties of self-dispersible pigment

| | Elemental analysis (% by mass) | | | | Reaction efficiency | Evaluation of reaction | Cycles of | Evaluation of purification | Structure of functional group |
| | C | N | O | S | (%) | efficiency | ultrafiltration | efficiency | (free acid type) |
|---|---|---|---|---|---|---|---|---|---|
| Ex. 1 | 87.0 | 0.8 | 9.9 | 1.2 | 19 | B | 4 | B | >N—S(=O)$_2$—Ph—COOH |
| Ex. 2 | 87.7 | 0.9 | 9.0 | 1.1 | 18 | B | 4 | B | >N—S(=O)$_2$—Ph—(COOH)$_2$ |
| Ex. 3 | 88.1 | 0.5 | 9.1 | 0.9 | 12 | B | 4 | B | >N—S(=O)$_2$—C$_3$H$_6$—COOH |
| Ex. 4 | 87.9 | 0.9 | 9.9 | ND | 20 | A | 4 | B | >N—CONH—Ph—(COOH)$_2$ |
| Ex. 5 | 87.6 | 0.9 | 10.0 | ND | 22 | A | 4 | B | >N—CONH—Ph—(COOH)$_2$ |
| Ex. 6 | 87.2 | 1.0 | 10.4 | ND | 30 | AA | 4 | B | >N—CONH—Ph—(COOH)$_2$ |
| Ex. 7 | 89.2 | 0.4 | 8.9 | ND | 12 | B | 4 | B | >N—CO—Ph—COOH |
| Ex. 8 | 88.0 | 0.9 | 9.5 | ND | 24 | A | 4 | B | >N—Ph—COOH |
| Ex. 9 | 88.4 | 0.5 | 9.6 | ND | 18 | B | 4 | B | >N—Ph—(COOH)$_2$ |
| Ex. 10 | 88.1 | 0.6 | 10.0 | ND | 30 | AA | 4 | B | >N—Ph—(COOH)$_2$ |
| Ex. 11 | 88.2 | 0.5 | 9.7 | ND | 30 | AA | 4 | B | >N—Ph—(COOH)$_2$ |
| Ex. 12 | 87.6 | 0.7 | 10.4 | ND | 30 | AA | 3 | A | >N—Ph—(COOH)$_2$ |
| Ex. 13 | 87.5 | 0.7 | 10.3 | ND | 30 | AA | 4 | B | >N—Ph—(COOH)$_2$ |
| Ex. 14 | 87.7 | 0.7 | 10.5 | ND | 26 | A | 4 | B | >N—Ph—(OH)(COOH) |
| Ex. 15 | 89.2 | 0.7 | 8.9 | ND | 30 | AA | 3 | A | >N—Ph—CONH—CH(PO$_3$H$_2$)$_2$ |
| Ex. 16 | 86.8 | 0.7 | 9.7 | 1.6 | 30 | AA | 3 | A | >N—Ph—SO$_3$H |
| Ex. 17 | 88.9 | 0.5 | 9.6 | ND | 12 | B | 4 | B | >N—CH(COOH)$_2$ |
| Ex. 18 | 87.8 | 0.7 | 10.4 | ND | 30 | AA | 3 | A | >N—Ph—(COOH)$_2$ |
| Ex. 19 | 87.9 | 0.6 | 10.2 | ND | 30 | AA | 3 | A | >N—Ph—(COOH)$_2$ |
| Ex. 20 | 88.0 | 0.6 | 10.1 | ND | 30 | AA | 3 | A | >N—Ph—(COOH)$_2$ |
| Ex. 21 | 87.8 | 0.7 | 10.3 | ND | 30 | AA | 3 | A | >N—Ph—(COOH)$_2$ |
| Ex. 22 | 61.3 | 20.1 | 3.6 | 1.2 | 19 | B | 4 | B | >N—S(=O)$_2$—Ph—(COOH)$_2$ |
| Ex. 23 | 62.9 | 20.4 | 2.8 | ND | 21 | A | 4 | B | >N—CONH—Ph—(COOH)$_2$ |
| Ex. 24 | 72.9 | 8.7 | 12.7 | 1.0 | 15 | B | 4 | B | >N—S(=O)$_2$—Ph—(COOH)$_2$ |
| Ex. 25 | 75.5 | 8.9 | 11.0 | ND | 19 | B | 4 | B | >N—CONH—Ph—(COOH)$_2$ |
| Ex. 26 | 72.4 | 9.3 | 15.1 | ND | 11 | B | 5 | B | >N—CONH—Ph—(COOH)$_2$ |
| Comp. Ex.1 | 89.7 | 0.1 | 9.9 | ND | 9 | C | 7 | C | —Ph—COOH |
| Comp. Ex.2 | 91.6 | ND | 7.5 | ND | 6 | C | 6 | C | —COOH |
| Ref. Ex. | 98.4 | ND | 1.7 | ND | — | — | — | — | — |

As a result of the elemental analysis, it was confirmed that a nitrogen atom is present in the self-dispersible pigments produced by the production process according to the present invention. Accordingly, it is suggested that the production process according to the present invention is carried out via a reaction mechanism in which a nitrogen atom is introduced into a particle surface of a pigment. On the other hand, the amount of nitrogen atoms in Comparative Self-Dispersible Pigment 1 was at a detection limit or less. This elemental analysis is generally known to have an error of 0.3% by mass, and so the amount may be said to be almost close to the detection limit taking this into consideration. In addition, no nitrogen atom was detected about Comparative Self-Dispersible Pigment 2. That is, the production processes of Comparative Examples 1 and 2 are not carried out via the reaction mechanism in which a nitrogen atom is introduced into a particle surface of a pigment. The production process of Comparative Example 1 includes a reaction of an aryl radical generated by elimination of nitrogen atoms with a particle surface of a pigment, and the production process of Comparative Example 2 is of an oxidation method, so that both processes agree with the fact that no nitrogen atom participates in the reaction. These results mean that the self-dispersible pigments according to the present invention and the comparative self-dispersible pigments are obtained by different reaction modes, and that the structures of the functional groups on the particle surfaces of the pigments are also different.

In addition, the mass ratio of nitrogen atoms to oxygen atoms or sulfur atoms in an amine compound used almost conforms to the mass ratio in the elemental analysis. When comprehensively viewed from this respect and the findings obtained from the above-described Synthetic Examples 1 and 2, it can be concluded that nitrogen elimination does not occur in the process of the reaction, and an aziridine ring is formed on the particle surface of the pigment.

The production process according to the present invention is then considered by comparing Example 1 with Comparative Examples 1 and 2. The ultrafiltration for the purification in Example 1 required four cycles, while that in Comparative Examples 1 and 2 required 7 cycles and 6 cycles, respectively. That is, the production process according to the present invention may be said to be a process with less generation of residual products and by-products and with excellent purification efficiency. In addition, the reaction efficiency of Example 1 is higher than that of Comparative Examples 1 and 2. That is, the production process according to the present invention may be said to be an efficient process capable of modifying a pigment into a self-dispersible pigment with a less used amount of the treatment agent. In Comparative Example 1, it is considered that the reaction efficiency was low because decomposition of the treatment agent and another coupling reaction between radical species than the modification of the pigment into the self-dispersible pigment occurred, and lots of nitrogen gas bubbles were generated.

Recording of Image

After an aqueous dispersion liquid of each self-dispersible pigment and the following respective components (unit: %) were mixed and sufficiently agitated, the resultant mixture was filtered under pressure through a membrane filter having a pore size of 1.2 μm (trade name "HDCII FILTER", product of Pall Corporation) to prepare each ink. "ACETYLENOL E100" is a trade name of a nonionic surfactant (product of Kawaken Fine Chemicals Co., Ltd.).

Aqueous dispersion liquid: 30.0%
Glycerol: 15.0%
Triethylene glycol: 5.0%
ACETYLENOL E100: 0.2%
Ion-exchanged water: 49.8%.

The ink prepared was filled into an ink cartridge, and the ink cartridge was installed in an ink jet recording apparatus (trade name "PIXUS MP480", manufactured by Canon Inc.) in which the ink is ejected from a recording head by the action of thermal energy. This ink jet recording apparatus was used to record a solid image whose recording duty is 100% on a recording medium (plain paper, trade name "PB PAPER GF-500", product of Canon Inc.). As a result, When the self-dispersible pigments produced in Examples were used, all the solid images were high in optical density compared with the cases where comparative self-dispersible pigments produced by using the same pigment species and structures of functional groups in Comparative Examples 1 and 2 as those of the respective corresponding Examples to be compared were used, so that high-quality images could be recorded.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-133785, filed Jun. 30, 2014, which is hereby incorporated by reference herein in its entirety.

What is claimed is:

1. A production process for a self-dispersible pigment, the process comprising a step of bonding a functional group containing a hydrophilic group to a particle surface of a pigment by causing a compound represented by the following general formula (1) to react with the particle surface of the pigment:

(1)

wherein $R_1$ is a halogen atom, $R_2$ is an alkali metal, $R_3$ is a single bond, —CO—, —CONH— or —SO$_2$—, and $R_4$ is a group (a) having at least one of an aliphatic group and an aromatic group and (b) being substituted with at least one hydrophilic group selected from the group consisting of a carboxylic acid group, a sulfonic acid group, a phosphoric acid group, and a phosphonic acid group.

2. The production process according to claim 1, wherein in the general formula (1) $R_1$ is a chlorine atom and $R_2$ is sodium.

3. The production process according to claim 1, wherein the step is conducted in the presence of at least one reaction accelerator selected from the group consisting of copper, copper oxides, copper halides, copper sulfate, iodine, ammonia, aliphatic amines, aliphatic alcoholamines and hydrazine.

4. The production process according to claim 1, wherein the step is conducted in the presence of at least one reaction accelerator selected from the group consisting of iodine, ammonia and aliphatic primary amines.

5. The production process according to claim 1, wherein the step is conducted in an aqueous system.

6. The production process according to claim 1, wherein the process is conducted at a pH of 1 or more to 13 or less.

7. The production process according to claim 1, wherein the process is conducted at a pH of 8 or more to 10 or less.

8. The production process according to claim 1, wherein the process is conducted at a temperature of 80° C. or less.

9. The production process according to claim 1, wherein the pigment constituting the self-dispersible pigment is at least one of an inorganic pigment and an organic pigment.

10. The production process according to claim 1, wherein the pigment constituting the self-dispersible pigment is a carbon black.

11. The production process according to claim 1, wherein the compound represented by the general formula (1) is formed by a reaction of a primary amine compound with a halogenating agent.

12. The production process according to claim 1, wherein the compound represented by the general formula (1) is formed by a reaction of a compound represented by $H_2N$—$R_3$—$R_4$ with a halogenating agent.

13. The production process according to claim 1, wherein $R_1$ is a chlorine atom.

14. The production process according to claim 1, wherein $R_2$ is sodium.

15. A self-dispersible pigment produced by the production process according to claim 1.

16. An ink comprising a self-dispersible pigment, wherein the self-dispersible pigment is the self-dispersible pigment according to claim 15.

17. An ink cartridge comprising an ink and an ink storage portion storing the ink, wherein the ink comprises the ink according to claim 16.

18. An ink jet recording method comprising ejecting an ink from a recording head of an ink jet system to record an image on a recording medium, wherein the ink comprises the ink according to claim 16.

19. A preparation process for an ink, comprising a step of producing a self-dispersible pigment and a step of preparing an ink by mixing components including the self-dispersible pigment and an aqueous medium, wherein the step of producing the self-dispersible pigment is the production process according to claim 1.

* * * * *